United States Patent [19]

McEwen

[11] Patent Number: 4,975,184

[45] Date of Patent: Dec. 4, 1990

[54] HORIZONTAL REMOVABLE PUMP FOR FILTRATION SYSTEMS

[75] Inventor: Stephen N. McEwen, Bowling Green, Ohio

[73] Assignee: Henry Filters, Inc., Bowling Green, Ohio

[21] Appl. No.: 268,731

[22] Filed: Nov. 8, 1988

Related U.S. Application Data

[63] Continuation-in-part of Ser. No. 144,058, Jan. 15, 1988, abandoned.

[51] Int. Cl.$^5$ .............................................. F04B 35/04
[52] U.S. Cl. .................................. 210/136; 29/889.1; 210/258; 210/416.5; 417/360; 417/423.7; 417/423.14; 417/423.15
[58] Field of Search ..................... 210/416.1, 167, 168, 210/251, 258, 234, 236, 400, 402, 784, 416.5, 136; 417/360, 448, 423.14, 423.15, 423.7; 222/333; 29/156.4 R, 156.8 R; 137/15

[56] References Cited

U.S. PATENT DOCUMENTS

| | | | |
|---|---|---|---|
| Re. 32,135 | 5/1986 | Creps et al. ............................ | 210/260 |
| 2,934,245 | 4/1960 | Emeny .................................. | 417/360 |
| 3,093,269 | 6/1963 | Messer ................................. | 222/333 |
| 3,407,747 | 10/1968 | Rule . | |
| 3,719,429 | 3/1973 | Rule .................................. | 417/423.14 |
| 3,907,463 | 9/1975 | Eller et al. ............................ | 417/360 |
| 4,210,539 | 7/1980 | Shiban ................................ | 210/402 |
| 4,403,923 | 9/1983 | Korchin ............................... | 417/360 |
| 4,507,061 | 3/1985 | McEwen et al. ..................... | 417/360 |
| 4,693,271 | 9/1987 | Hargrove et al. .................... | 447/360 |
| 4,715,964 | 12/1987 | Harms ................................ | 210/251 |
| 4,761,226 | 8/1988 | Creps ................................. | 210/416.1 |

FOREIGN PATENT DOCUMENTS

| | | | |
|---|---|---|---|
| 2240651 | 3/1975 | France ................................. | 417/360 |
| 5124505 | 9/1980 | Japan ................................. | 210/416.5 |
| 7508544 | 1/1977 | Netherlands ......................... | 417/360 |

Primary Examiner—Frank Spear
Assistant Examiner—Joseph Drodge
Attorney, Agent, or Firm—Brooks & Kushman

[57] ABSTRACT

The filtration system includes a tank and a pump for suctioning clean filtrate from the tank and pumping filtrate into a discharge manifold. The pump includes a suction inlet port, an impeller and a discharge head. A suction connection to the filtrate is provided in the side wall of the tank and a fixed discharge housing includes an annular enclosure which cooperates, when the pump is installed, with the pump discharge head to connect the pump discharge to the manifold. To install the pump, the inlet suction port and impeller are passed horizontally through the annular enclosure for sealing connection with the tank receptor ring. The discharge head mates with the annular enclosure whereby filtrate may be pumped from the tank through the discharge head to the manifold. To remove the pump, the pump is displaced in the opposite horizontal direction by withdrawing the head from the annular housing and the impeller and suction inlet port through the annular housing.

Alternatively, the pump can be pre-mounted in a holder or container, with the discharge head prealigned with the annular enclosure, where the inlet suction port does not require sealing connection with a receptor ring.

30 Claims, 3 Drawing Sheets

HORIZONTAL REMOVABLE PUMP FOR FILTRATION SYSTEMS

RELATED APPLICATIONS

This application is a continuation-in-part of U.S. patent application Ser. No. 144,058, now abandoned for PUMP FOR FILTRATION SYSTEMS, filed Jan. 15, 1988 in the name of Stephen N. McEwen.

BACKGROUND AND SUMMARY OF THE INVENTION

The present invention relates generally to pumps for filtration systems used in industrial applications, such as cleaning machine coolant containing contaminants and machining chips and returning clean coolant to the machine tools for reuse, and particularly relates to pumps and apparatus and methods for mounting the pumps in relation to the filtration tanks used in such systems such that the pumps are readily and easily removed from service and reinstalled in the filtration systems.

As will be recalled from a review of my prior application Ser. No. 144,058, identified above, the disclosure of which is incorporated herein by reference, filtration tanks for such industrial applications are generally set below elevation such that the contaminated liquid and machining chips may flow from the machine tools to the tanks. In the tank, the larger and heavier machine tool chips and other debris tend to settle to the bottom of the tank and a dragout conveyor system or other mechanical means are employed to convey the chips and resulting swarf from the tank for removal. Filters are employed in the tank to separate the smaller chips and other contaminants from the coolant. One well-known and commercially successful filtration system used for this purpose is sold by the assignee hereof, Henry Filters, Inc., and employs one or more horizontally disposed, generally cylindrical, filter drums located adjacent the bottom of the tank. A suction is provided to the interior of each filter drum to pull coolant from the tank through the filter element and deliver clean coolant to a clean coolant compartment which forms a part of the filtration tank. Filter cake, comprised of small chips and other contaminants, is thus formed on the outside of the drum surface. Periodic indexing of the filter drum in conjunction with a doctor blade removes portions of the accumulated filter cake, which drop to the bottom of the tank for removal, as shown in Applicant's U.S. Pat. No. Re 32,135.

As stated in the prior application, vertical turbine-type pumps are frequently used, along with other types, to pump the clean coolant from the clean coolant compartment of the filtration tank to the machine tools. Those pumps, from time to time, require periodic service and maintenance. To remove a pump of that type from a filtration tank involves considerable labor, downtime, and the services of a number of different types of skilled tradesmen, all of which adds to the expense of the system. The problems associated with the removal of those types of pumps are outlined in greater detail in my prior above-identified application and its subject matter is directed generally to replacement of such pumps with novel and improved pumps and ancillary mounting apparatus therefor.

One solution to those problems, as disclosed in my prior application, provides a pump head with the drive motor therefor being of the submersible type and submerged with the pump below the coolant level. Another solution provides a drive motor separable from the pump which is disposed above the coolant level in the tank with a disconnectable driveshaft coupling the drive motor to the pump head. In those embodiments, the pump has its suction inlet port receivable in a suction receptor ring adjacent the bottom of the clean coolant tank. The discharge head of the pump is also receivable in an annular housing fixed in the tank and which housing forms with the discharge head an annular chamber in communication with a fixed discharge outlet conduit. In accordance with the invention disclosed in that prior application, the pump suction and discharge connections are effected simply by lowering the pump into the tank. No bolting, pipe connections or further movement of any of the elements of the pump or tank to effect the two pump connections are required. Likewise, the removal of the pump is accomplished simply by lifting the pump from the tank, similarly without physically disconnecting the pump and pipe connections in the tank, for example, by unbolting or the like. Various forms of the above-described invention are set forth in the prior patent application and each disclosed embodiment specifically has a vertical pump orientation, i.e., the axis of rotation of the impeller is generally vertical.

In accordance with the present invention, a horizontal pump orientation may also advantageously be used such that the suction and discharge sides of the pump can be connected and disconnected relative to the tank, for example, through a side wall of the tank. That is to say, the horizontal pump orientation enables the pump to be mounted external to the clean tank with the suction side of the pump communicating with the clean filtrate similarly as described in the prior application. Significant advantages are afforded by a horizontal pump mounting For example, in many installations, there is insufficient headroom or headroom barely sufficient to remove, with difficulty, the pumps in a vertical direction from the tanks. Where headroom is at a premium, oftentimes space to one side of the tank is not, and is therefore available. Consequently, a side-mounted, horizontally oriented, pump installation which could be readily installed and removed, affording similar advantages as the vertical pump orientation specifically disclosed in my prior application is highly beneficial. Moreover, such horizontal pump orientation may be used with tanks which are either below elevation or at elevation, i.e., sitting on the floor of an industrial facility. An additional advantage resides in the ability to use an externally mounted motor, which, for example, could be an air-cooled motor, to drive the pump. A submersible motor may also be used under conditions where there is risk of flooding of the motor. Additionally, the horizontal orientation can be easier to retrofit in existing installations than the vertical pump depending on the accessibility of the tank.

To accomplish the foregoing and in accordance with the present invention, there is provided a filtration tank, preferably, but not necessarily, having a clean compartment in which there is provided a side opening in communication through a tank outlet conduit with the filtrate in the clean coolant compartment of the tank. The side opening preferably includes a receptor ring for receiving the suction inlet port of the pump. Suitable seals are provided between the receptor ring and the pump inlet port to seal the inlet port and the side opening of the tank one to the other upon installation of the pump. There is additionally provided a fixed housing comprised of an enclosure in the form of an annulus having a fixed outlet conduit in communication with a manifold for flowing clean filtrate from the pump discharge for return to the machine tools. The pump includes an impeller between its inlet port and discharge head. The pump discharge head includes a pair of axially spaced end walls in part defining an annular chamber for receiving clean filtrate or coolant from the pump inlet port.

When the pump is mounted in the housing and inlet port is disposed in the receptor ring, the annular housing and the end walls of the pump discharge head form the annular chamber in communication through the impeller and pump inlet port with the filtrate in the clean coolant compartment. Consequently, when the pump is actuated, filtrate may be pumped through the pump inlet port and into the annular chamber formed by the housing and pump discharge head for flow through the fixed outlet conduit and return to the machine tools.

In accordance with the present invention, the pump is removably mounted relative to the housing and tank. Specifically, the pump is disposed on a generally horizontal axis coincident with the impeller axis. The size of the inlet port and impeller are such that those elements may be displaced through the annular housing. Thus, to install the pump, the inlet port and impeller housing are first inserted through the annular discharge housing. The pump inlet port is then received in the receptor ring in the side wall opening of the tank. At the same time, the end walls of the pump discharge head are marginally sealed against the horizontally oriented annular discharge housing, thereby completely enclosing the annular discharge chamber. A valve assembly is disposed in the tank outlet conduit such that, when the pump is not operating, the valve is closed to prevent leakage of air into the tank, and upon removal of the pump from the tank, the valve prevents the flow of filtrate toward the opening of the tank.

To remove the pump, for example, for servicing and maintenance, the valve assembly is closed and the pump is withdrawn in a generally horizontal direction away from the tank, generally parallel to the axis of rotation of the impeller such that the pump discharge head is removed from the annular housing. Upon such movement, the impeller and suction inlet port of the pump are also withdrawn and similarly pass through the annular housing. Once the maintenance on the pump is performed, the pump may be readily reinstalled. To accomplish this, the pump is inserted through the annular housing, inlet port end first, until the end walls of the pump discharge head mate and seal against the housing and the inlet port seals in the receptor ring. Suitable clamps are provided to clamp the pump to the housing to secure the pump in final installation. In that position, the pump inlet port is sealed to the tank outlet. Upon opening the valve assembly, and operating the pump, the filtrate flows from the tank through the pump to the manifold for return to the machine tools.

Similarly, as indicated in my prior application, the present installation and removal does not require bolting or unbolting of the pump or pipe connections nor does it require the services of skilled craftsmen. The suction and discharge connections and disconnections are effected automatically, in both instances, simply upon generally horizontal displacement of the pump in respective opposite directions. It will also be appreciated that the discharge housing is preferably external to the tank and fixed either to the tank or to ancillary support structure separate from the tank. Alternately, the discharge housing may be an integral part of the tank, similarly as in my prior application, but oriented horizontally rather than vertically. In this latter configuration, the discharge housing as well as its outlet conduit and the manifold may be disposed within the tank, the housing being accessible to the pump externally of the tank.

In accordance with a preferred embodiment of the present invention, there is provided apparatus for pumping liquid, comprising a tank for containing the liquid, a pump for pumping liquid from the tank and having an inlet port, a discharge head and an impeller mounted for rotation about a generally horizontal axis for supplying liquid from the tank through the inlet port to the discharge head. Means carried by the pump head define at least in part a chamber for receiving the liquid discharge from the head and means are provided for removably connecting the pump to the tank. These connecting means include a housing for encompassing at least in part the pump discharge head and an outlet conduit connected to the housing, the housing defining in part the chamber when the pump is connected to the tank whereby liquid may be pumped from the tank into the pump inlet and the chamber for discharge into the outlet conduit. The pump inlet port is of a size to pass through the housing upon displacement of the pump in the direction of the horizontal axis thereof to remove the pump from the tank.

In another aspect of the present invention, there is provided, in a tank for containing a liquid, a filter having a suction side, communicating means in communication with the suction side of the filter, a discharge outlet conduit, and a pump having an inlet port, a discharge head, and an impeller, the pump being disposable on the suction side of the filter in communication with the communicating means for suctioning liquid from the tank through the filter, the communicating means and the pump inlet port for discharge through the discharge head into the discharge outlet conduit, a method of installing the pump in communication with the filtrate on the suction side of the filter, comprising the steps of (a) positively effecting below the level of liquid in the tank a suction connection between the pump inlet port and the communicating means; (b) positively effecting a discharge connection between the discharge head and the outlet conduit and (c) wherein steps (a) and (b) are accomplished by displacing the pump in a generally horizontal, direction.

In an alternative embodiment of the invention, a container is provided which is adapted to receive the pump. In this embodiment, the container has an annular enclosure for receiving and mating with the discharge head. The container is then secured to the tank and the pump may still be inserted and removed through the container. In this embodiment, a receptor ring is not required for the inlet suction port. A valve assembly is also included and may be secured to the container which is then secured to the tank. The valve assembly may also be within the tank such that when the pump is shut off or removed the valve assembly is closed.

Accordingly, it is a primary object of the present invention to provide a novel and improved pump and apparatus and methods for its installation and removal in an industrial filtration system whereby the pump may be readily and easily installed and removed from the filtration system in a generally horizontal direction.

These and further objects and advantages of the present invention will become more apparent upon reference to the following specification, appended claims and drawings.

DETAILED DESCRIPTION OF THE DRAWING FIGURES

Reference will now be made in detail to the present preferred embodiment of the invention, an example of which is illustrated in the accompanying drawings.

Figure 1:
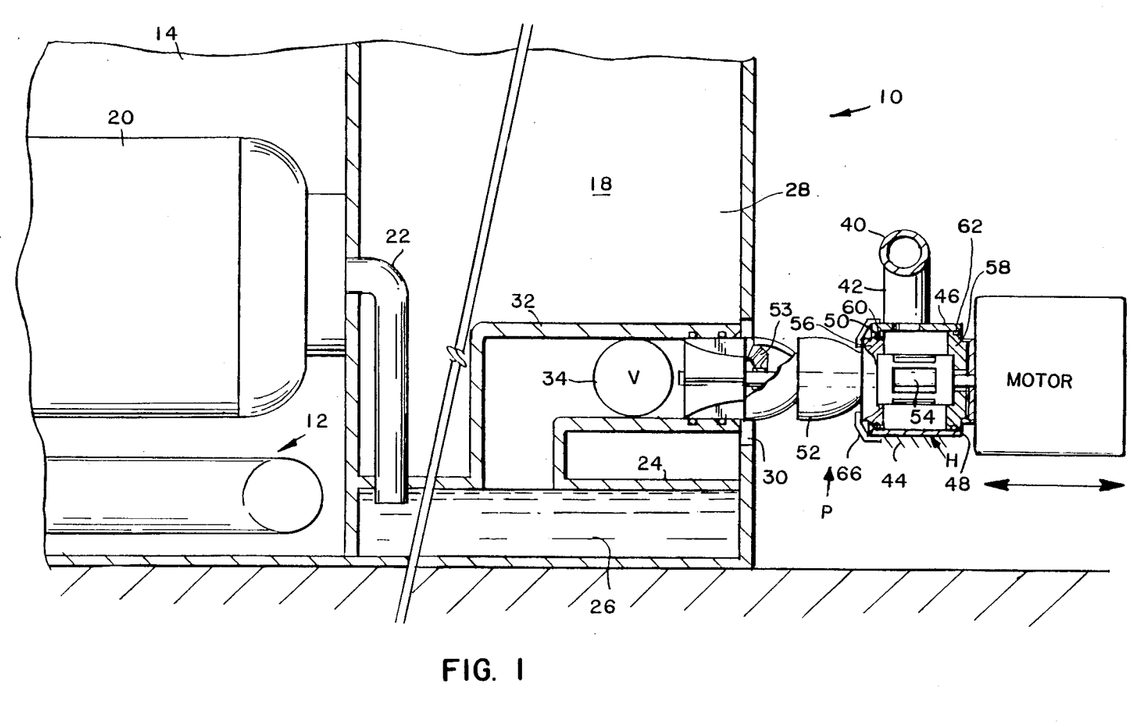
FIG. 1 is a fragmentary vertical crosssectional view through a filtration tank illustrating the contaminated liquid compartment and a clean filtrate compartment and a pump installed in accordance with the present invention.

Referring now to the drawings, particularly to FIG. 1, there is illustrated a settling tank, generally designated 10, which may be set into a pit disposed below elevation (floor level) or at elevation (on top of the floor) in an industrial environment. If set into a pit, adequate space to one side of the tank is provided as part of the pit for purposes of mounting and demounting the pumps as set forth hereinafter. Tank 10 is preferably generally rectilinear in configuration and has a sloping end wall, not shown, which is used in conjunction with a dragout conveyor, generally designated 12, for removing contaminants from the tank, both settled and filtered from the liquid in the tank. The tank is preferably comprised of two discrete compartments, a dirty or contaminated coolant compartment 14, for receiving dirty coolant from machine tools, not shown, and a clean coolant compartment 18 for receiving clean filtered coolant from compartment 14. One or more horizontally disposed, generally cylindrical, drum filters 20 is disposed in the contaminated coolant compartment 14 and may, for example, comprise a wedgewire suction indexing drum filter of the type manufactured by assignee of the present invention, Henry Filters, Inc. Suffice to say, filter 20 comprises an elongated drum having fine wire about its periphery for forming and collecting a filter cake on its outer surface comprised of contaminants while permitting coolant to pass through the filter cake and wire into the interior of the drum. As set forth more particularly in detail hereinafter, a suction is applied to the interior of the drum by the pump or pumps, generally designated P and discussed hereinafter, and clean coolant thus flows from the interior of drum 20 to the clean coolant compartment 18 by way of a conduit 22.

Clean coolant compartment 18 preferably includes an elevated false floor 24 above the bottom wall of the tank and thus defines a lower chamber 26 for receiving clean coolant via conduit 22 from the suction side of the filter drum. Clean coolant also resides in the upper chamber 28 above false floor 24 because a percentage of the pump discharge is provided, by means not shown, to the clean tank so that the entire clean tank, including both chambers, is normally filled with clean liquid. Communication between the lower chamber 26 and upper chamber 28 of clean compartment 18 is provided by a normally closed valve, not shown, and which valve is opened when the filter drum is indexed. In this manner, the suction of the pump can be removed from the filter drum so that the filter drum can be indexed while the pump or pumps continue to pump clean coolant from clean tank 18 to the machine tools.

In the clean coolant tank, there is provided one or more side openings 30, dependent on the number of pumps. Each opening 30 lies in communication with the clean coolant chamber 26 by way of a conduit 32. The conduit has a valve assembly 34 which may be manually or automatically opened and closed in a conventional manner. The valve assembly 34 is closed when the pump is turned off to prevent the flow of air into the tank. When the pump is turned on again, the valve assembly is opened to allow filtrate to flow to the pump. If the pump is to be removed, the valve assembly is secured in its closed position to prevent the flow of filtrate toward the opening in the tank.

Alternatively, instead of one valve assembly, a service valve and check valve may be used in series in the conduit, with the service valve being upstream of the check valve.

Figure 2:
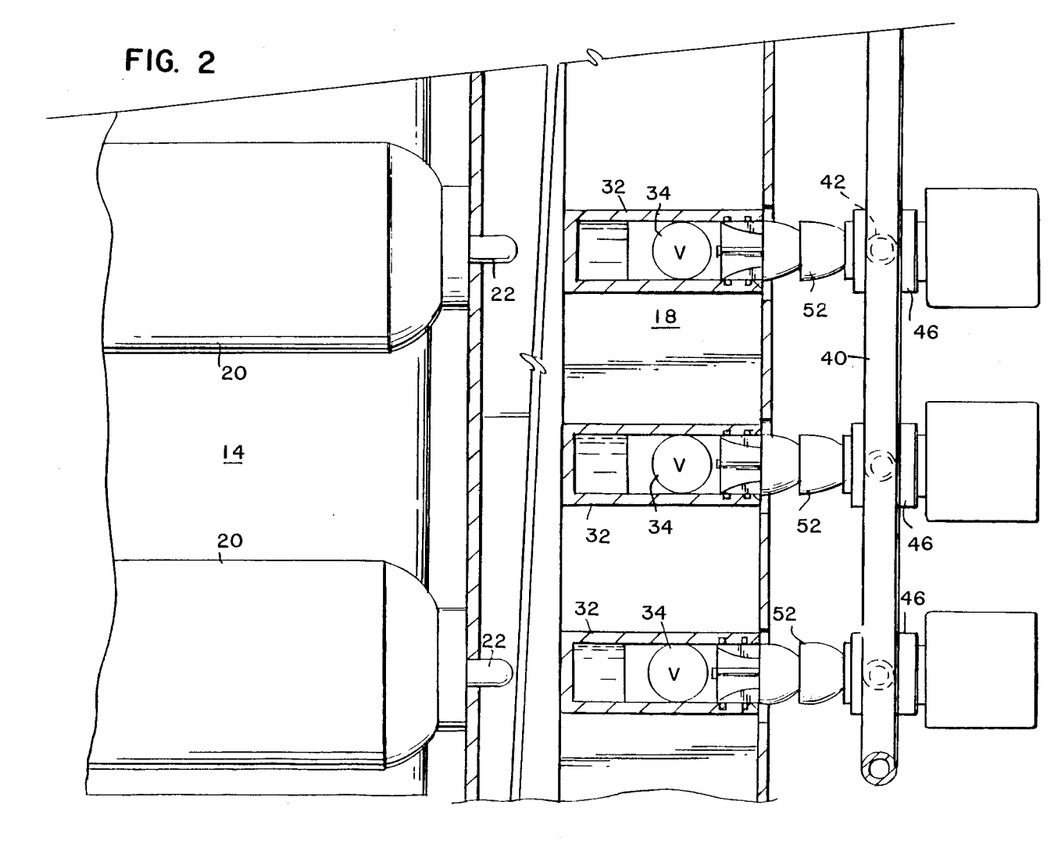
FIG. 2 is a horizontal cross-sectional view of the tank and pump illustrated in FIG. 1 illustrating the plurality of filters and pumps in a typical installation.

As illustrated in the drawing figures, a plurality of pumps P are provided for suctioning clean coolant from chamber 26 and supplying it to a header or manifold 40 by way of branch outlet conduits 42 from each pump P. It will be appreciated that the header and branch outlet conduits are disposed externally of the tank, although, as explained later, the header and branch outlet conduits 42 may be disposed internally of the tank similarly as in my prior patent application identified above. Each branch outlet conduit 42 carries a check valve, not shown, between a fixed discharge housing 46 of an associated pump and header 40 so that, upon removal of the pump, as explained hereinafter, clean coolant from header 40 may not backflow into pump housing 46. It will be appreciated that the portion of conduit 32 adjacent the side outlet opening 30 forms a suction receptor ring for the inlet port of the pump. Thus, the suction inlet connection for the pump constitutes a fixed part of the tank. The suction receptor ring may have axially spaced grooves for receiving 0-ring seals 43 and the end of the ring may be bevelled or tapered to facilitate insertion of the pump inlet port into the ring in a manner set forth hereinafter. The pump discharge housing 46, however, is carried by a support structure 44 which may or may not form part of the tank i.e., the housing 46 may have ancillary support structure, not part of the tank. As illustrated in FIG. 1, the discharge housing 46 comprises an annular enclosure or receptor ring which has an outwardly flared or tapered edge 48 at one end (the righthand end as illustrated in FIG. 1) and an inwardly tapered flange 50 at its opposite end (the lefthand end as illustrated in FIG. 1). Pump P is illustrated, of course, in its installed position relative to the tank. Pump P has one or more axially spaced outer casings 52 which house the impeller stages. One or more of the impellers 53 is driven by a shaft 54 which extends through the pump discharge head H and terminates at one end in bearings, not shown, secured to the pump casing 52 adjacent the inlet port of the pump. Thus, clean coolant from chamber 26 may be pumped by the impeller into the pump discharge head H. The pump is driven by a motor M.

As illustrated in FIG. 1, pump head H includes a pair of axially spaced end walls 56 and 58, respectively. End wall 56 adjacent impeller housing 52 carries on an 0-ring seal 60 for engaging against the tapered flange 50 in final installation. The opposite end wall 58 carries an 0-ring seal 62 for engaging the inner wall of the annular enclosure 46. Consequently, a discharge chamber C is defined between the end walls 56 and 58 and within enclosure 46 for receiving fluid pumped from the clean tank 18. Suitable clamps 66 are provided for clamping the pump discharge head H to housing 46.

As in the prior application, the outer diameter of the pump casing 52 and the inlet port to the pump P are slightly less than the diameter of the annular housing 46. Consequently, the impeller casings and suction inlet port of the pump may be displaced axially (horizontally) through housing 46 in either direction for installation and removal of the pump.

As indicated previously, the pumps are illustrated in their installed positions. Thus, to remove one of the pumps, for example, for maintenance purposes, valve assembly 34 is secured closed and the clamps 66 are released. The pump P is then displaced endwise, i.e., in a direction generally parallel the axis of rotation of its impellers, to withdraw the discharge head H endwise from housing 42 and likewise withdraw the impeller casings 52 and inlet port through housing 46. For example, as illustrated in FIG. 1, the pump may be withdrawn in a horizontal direction from left to right. It will be appreciated that the withdrawal of pump P is accomplished without disconnecting any fittings, piping or electrical connections, or removing any bolts or manipulation of any valves other than the valve assembly 34. Once the pump has been removed, it will be appreciated that the remaining pumps in the system may continue to operate and supply coolant from the clean coolant compartment 18 to the machine tools, not shown.

To reinstall the removed pump, the process is simply reversed. That is, the inlet port to the pump and impeller casings 52 are first disposed, i.e., telescopically received, through annular housing 46. The inlet port for the pump is aligned with the opening 30 in the side wall of the tank and further axial displacement of the pump, for example, from right to left as illustrated in FIG. 1, enables the inlet port to be disposed in the suction receptor ring such that the annular seals 43 seal the pump inlet port and the receptor ring one to the other. As the pump is moved from right to left, the end walls of pump head H are disposed within housing 46 and the O-ring seals seal against the interior margins of housing 46. Clamps 66 are then closed to secure the pump to the housing and valve assembly 34 is opened. The pump is thus operational. As in the removal of the pump, its reinstallation does not require any connection of fittings, piping or electrical elements nor does it require the services of skilled tradesmen. The valve assembly can be made to operate manually or automatically.

It will be appreciated that the support structure 44 for housing 46 may be part of the tank 10 or may be a structure ancillary to the tank. It will also be appreciated that housing 46, together with the discharge conduits 42 and manifold 40 may be situated within clean compartment 18. That is to say, the annular housing 46 may be formed at the side wall of the tank, with the receptor ring for the suction inlet port of the pump being disposed further inwardly of the tank along conduit 32. In that configuration, the only part of the pump exposed externally of the side wall of the tank would be motor M and the same sequence of steps for installation and removal of the pump would be followed, with the corresponding beneficial results.

Figure 3:
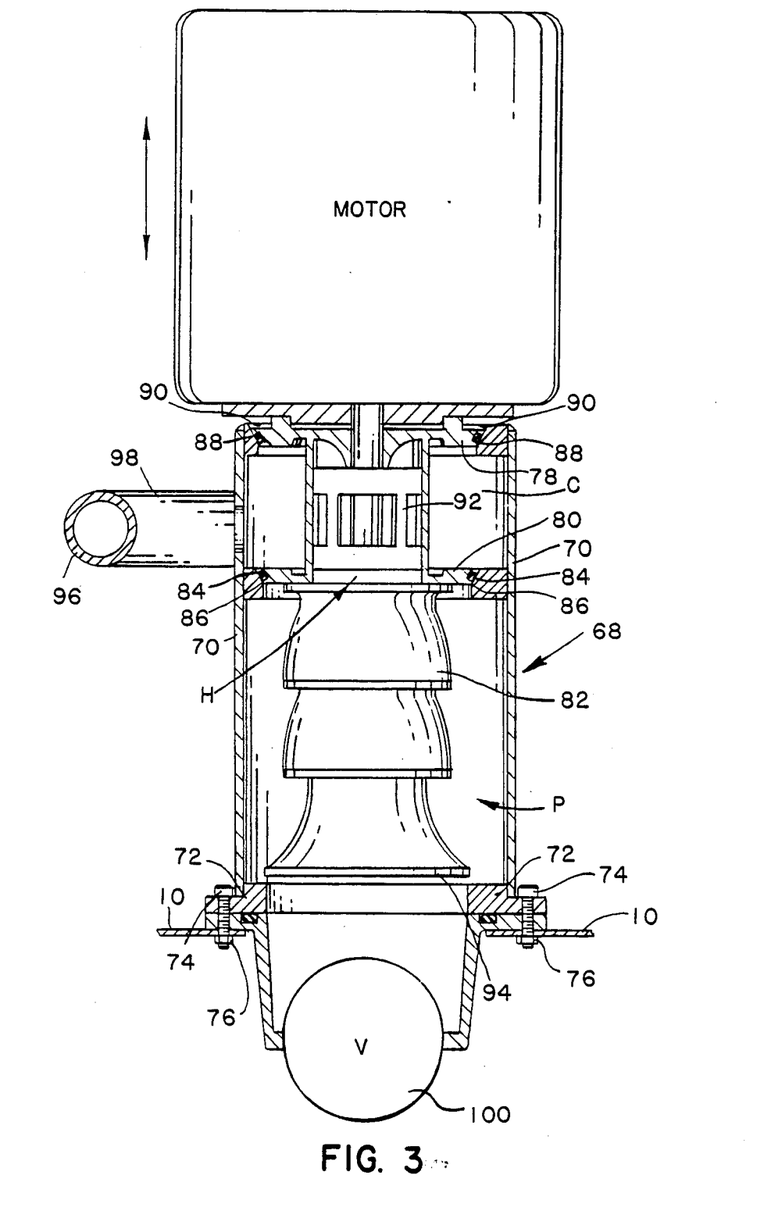
FIG. 3 is a vertical cross-sectional fragmented view of an alternate embodiment of the invention illustrating the pump installed in a container.

In an alternative embodiment shown in FIG. 3, the pump is pre-mounted in a container which is generally designated by 68. In the previous embodiment, precision tooling is required for the inlet suction port to properly align and make a sealing connection with the receptor ring and precision tooling is also required for the discharge head to properly align and mate with the annular enclosure. In the embodiment of FIG. 3, the precision tooling may be done separately from the tank such that the annular enclosure in the container and discharge head are properly aligned prior to securing the container to the tank. Additionally, as shown in FIG. 3, there is no need for a receptor ring for the inlet suction port. This reduces the amount of precision tooling required and allows for the entire container 68 to be mounted to the side of the tank without requiring two separate precision tooling connections.

In reference to FIG. 3, the container 68 is preferably made of seamless steel pipe 70 which includes a flange 72 for mounting to the side of the tank 10. As shown in FIG. 3, the container 68 can be bolted to the tank via nuts 74 and bolts 76, or alternatively secured to the tank such as by welding. Pump head H as in the previous embodiments includes a pair of axially spaced end walls 78 and 80, respectively. End wall 80 adjacent impeller housing 52 carries an 0-ring seal 84 for engaging against tapered flange 86 in final installation. The opposite end wall 78 carries an 0-ring seal 88 for engaging the inner wall of annular enclosure 90.

As with the previous embodiments, a discharge chamber C is defined between the end walls 78 and 80 and within enclosure 70 for receiving fluid pumped from the clean tank 18. Suitable clamps (not shown) are provided for clamping the pump discharge head H to the housing 70.

As with the previous embodiments, the outer diameter of the pump casing 82 and the inlet port of the pump P are slightly less than the diameter of the annular housing 70. Consequently, the impeller casings and suction inlet port of the pump may be displaced axially (horizontally) through housing 70 in either direction for installation and removal of the pump from the container 68.

In this embodiment, as with the previous embodiments, a shaft 92 is provided, and a suction inlet port 94 is also included. The clean coolant is suctioned from chamber 26 and supplied to a manifold 96 by way of branch outlet conduits 98 from each pump P.

As with the previous embodiment, the pump has one or more axially spaced outer casings which house the impeller stages. In this embodiment, the inlet port does not require a receptor ring. The container is mounted on the tank and the discharge head is properly sealed within the annular enclosure 70 which prevents fluid from being drawn into the discharge head other than through the inlet port. A valve assembly 100 is included which is secured between the tank and the container. Alternatively, the valve assembly may be used as in the previous embodiment where it is contained within a conduit in the tank. The valve assembly 100 functions as in the previous embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for pumping liquid, comprising:
    a tank for containing the liquid;
    a pump for pumping liquid from the tank and having an inlet port, a discharge head and an impeller mounted on a shaft having a generally horizontal axis of rotation for supplying liquid from the tank through said inlet port to said discharge head;
    means carried by said pump head defining at least in part a chamber for receiving the liquid discharged from said head; and
    means for removably connecting said pump to said tank with said pump inlet port in communication with the fluid in said tank, said connecting means including a housing in permanently fixed relationship to said tank and for encompassing at least in part said pump discharge head for providing seating means for said pump head and an outlet conduit connected to said housing, said housing defining in part said chamber when said pump head is on said seating means to connect said pump to said tank whereby liquid may be pumped from said tank into said pump inlet and said chamber for discharge into the outlet conduit;
    said pump inlet port being of a size to pass through said housing upon displacement of the pump in the direction of the horizontal axis thereof to remove the pump from the tank.

2. An apparatus for filtering liquid machine tool coolant comprising:
    a settling tank having first and second compartments;
    said first compartment containing contaminated machine tool coolant;
    at least one cylindrical drum filter in said first compartment for filtering contaminants from the contaminated machine tool coolant to provide filtered coolant;
    means for removing the filtered contaminants from the first compartment;
    a pump including an inlet port, a discharge head and an impeller mounted on a shaft having a generally horizontal axis of rotation for providing suction to the filter in the first compartment to supply filtered coolant to the second compartment, and for supplying filtered coolant from the second compartment through said inlet port to said discharge head;
    means carried by said pump head defining at least in part a chamber for receiving the filtered coolant discharged from said head;
    means for removably connecting said pump to said tank with said pump inlet port in communication with the filtered coolant in the second compartment, said connecting means including a housing in permanently fixed relationship to said tank and for encompassing at least in part said pump discharge head for providing seating means for said pump head and an outlet conduit connected to said housing, said housing defining in part said chamber when said pump head is on said seating means to connect said pump to said tank whereby coolant may be pumped from said second compartment into said pump inlet and said chamber for discharge into the outlet conduit; and
    said pump inlet port being of a size to pass through said housing upon displacement of the pump in the direction of the horizontal axis thereof to remove the pump from the tank.

3. Apparatus according to claim 1 or 2 wherein said pump head includes a pair of axially spaced end walls in part defining said chamber therebetween, and means carried by said end walls for engaging said housing such that said chamber is defined in part by said housing and said end walls and lies in communication with said outlet conduit and said inlet port, said pump head being removable from said housing upon displacement of the pump in the direction of the horizontal axis thereof to remove the pump from the tank.

4. Apparatus according to claims 1 or 2 wherein said connecting means is external to said tank.

5. Apparatus according to claims 1 or 2 wherein said tank has an outlet passage in communication with the tank, and a valve in said outlet passage to close said outlet passage when the pump is removed from the tank.

6. Apparatus according to claims 1 or 2 wherein said housing includes a generally cylindrical discharge receptor ring for encompassing at least in part said pump head when said pump is operatively disposed in communication with the liquid in said tank, said pump head being generally cylindrical in shape and including a pair of axially spaced generally cylindrical end walls in part defining said chamber therebetween, and means carried by said end walls for engaging said receptor ring such that said chamber is generally annular and defined in part by said receptor ring and said end walls and lies in communication with said outlet conduit.

7. Apparatus according to claims 1 or 2 including a container adapted to receive the pump, said container including said housing, and wherein the container is secured to the tank.

8. Apparatus according to claim 7 including a check valve to prevent the flow of liquid to the pump when the pump is not operating.

9. Apparatus according to claim 1 or 2 including an electric motor connected to said pump to drive the pump and disposed externally of said tank.

10. Apparatus according to claim 9 wherein said motor is submersible.

11. A filtration apparatus comprising:
    a liquid tank for containing a body of liquid having contaminants therein;
    a filter submerged in said tank for separating the contaminants from the liquid to provide liquid filtrate;
    means for removing the separated contaminants from the tank;
    means for removing the filtrate from the tank including a pump having an inlet port, a discharge head and an impeller mounted on a shaft having a generally horizontal axis of rotation for applying a suction to said filter and thereby supplying liquid filtrate from the tank through said inlet port to said discharge head;
    means carried by said pump head defining at least in part a chamber for receiving the liquid filtrate supplied to said discharge head; and
    means for removably connecting said pump to said tank with said pump inlet port in communication with the filtrate in said tank, including a housing in permanently fixed relationship to said tank and having an outlet conduit, said housing encompassing in part said pump head for providing seating means for said pump head and in part defining said chamber for communicating liquid filtrate from the pump head through said chamber into said outlet conduit when said pump head is on said seating means to connect said pump to said tank, said pump inlet port being of a size to pass through said housing upon displacement of the pump in the direction of the horizontal axis thereof to remove the pump from the tank.

12. An apparatus for filtering machine tool coolant comprising:
- a liquid tank for containing a body of machine tool coolant having contaminants therein;
- a filter submerged in said tank for separating the contaminants from the contaminated machine tool coolant to provide liquid filtrate;
- means for removing the filtrate form the tank including a pump having an inlet port, a discharge head and an impeller mounted on a shaft having a generally horizontal axis of rotation for applying a suction to said filter and thereby supplying liquid filtrate from the tank through said inlet port to said discharge head;
- means carried by said pump head defining at least in part a chamber for receiving the liquid filtrate supplied to said discharge head; and
- means for removably connecting said pump to said tank with said pump inlet port in communication with the filtrate in said tank, including a housing in permanently fixed relationship to said tank and having an outlet conduit, said housing encompassing in part said pump head for providing seating means for said pump head and in part defining said chamber for communicating liquid filtrate from the pump head through said chamber into said outlet conduit when said pump head is on said seating means to connect said pump to said tank, said pump inlet port being of a size to pass through said housing upon displacement of the pump in the direction of the horizontal axis thereof to remove the pump from the tank.

13. Apparatus according to claims 11 or 12 wherein said tank includes a contaminated liquid compartment and a liquid filtrate compartment, means in communication with said filter for supplying liquid filtrate to said liquid filtrate compartment, said pump inlet port lying in communication with the liquid filtrate in said liquid filtrate compartment.

14. Apparatus according to claims 11 or 12 wherein said pump head includes a pair of axially spaced end walls defining said chamber therebetween, and means carried by said end walls for engaging said housing such that said chamber is defined at least in part between said housing and said end walls and lies in communication with said outlet conduit and said inlet port.

15. Apparatus according to claims 11 or 12 wherein said tank has a side wall with an opening, said pump inlet being disposed in said side wall opening for communication with the filtrate in said tank.

16. Apparatus according to claims 11 or 12 wherein said housing is disposed external to said tank and said tank side wall.

17. Apparatus according to claims 11 or 12 including a container adapted to receive the pump, said container including said housing and wherein the container is secured to the tank.

18. Apparatus according to claim 17 including a check valve to prevent the flow of liquid to the pump when the pump is not operating.

19. In a tank for containing liquid, a filter having a suction side, communicating means in communication with the suction side of said filter, a discharge outlet conduit, and a pump having an inlet port, a discharge head, and an impeller mounted on a shaft having a generally horizontal axis of rotation, said pump being disposable on the suction side of said filter in communication with said communicating means for suctioning liquid from said tank through said filter, said communicating means and said pump inlet port for discharge through said discharge head into said discharge outlet conduit, a method of installing the pump in communication with the filtrate on the suction side of the filter, comprising the steps of:
(a) effecting a suction connection between said pump inlet port and said communicating means below the level of liquid in the tank;
(b) positively effecting a discharge connection between said discharge head and said outlet conduit; and
(c) wherein steps (a) and (d) are accomplished by displacing said pump in a generally horizontal direction.

20. In a tank for containing contaminated liquid machine tool coolant, a cylindrical drum filter for separating contaminants from the coolant to provide filtered coolant to a suction side of the filter, communicating means in communication with the suction side of said filter, a discharge outlet conduit, and a pump having an inlet port, a discharge head, and an impeller mounted on a shaft having a generally horizontal axis of rotation, said pump being disposable on the suction side of said filter in communication with said communicating means for suctioning liquid from said tank through said filter, said communicating means and said pump inlet port for discharge through said discharge head into said discharge outlet conduit, a method of installing the pump in communication with the filtrate on the suction side of the filter, comprising the steps of:
(a) effecting a suction connection between said pump inlet port and said communicating means below the level of liquid in the tank;
(b) positively effecting a discharge connection between said discharge head and said outlet conduit; and
(c) wherein steps (a) and (b) are accomplished by displacing said pump in a generally horizontal direction.

21. A method according to claims 19 or 20 wherein the generally horizontal direction is along the axis of the shaft.

22. A method according to claims 19 or 20 wherein steps (a) and (b) are accomplished without connection of any pipe couplings.

23. A method according to claims 19 or 20 wherein step (a) is accomplished externally of said tank.

24. A method according to claims 19 or 20 including a generally annular discharge housing in communication with said outlet conduit and including the further steps of displacing said pump in said generally horizontal direction such that said pump inlet and said impeller pass through said annular discharge housing prior to accomplishing steps (a) and (b); displacing said pump further in said generally horizontal direction such that said steps (a) and (b) are accomplished; and sealing said discharge head and said annular housing one to the other.

25. A method according to claims 19 or 20 including a method of removing the pump from communication with the filtrate on the suction side of the filter, including the step of displacing the pump in a direction generally opposite to said generally horizontal, direction to effect disconnection between said inlet port and said communicating means on the suction side.

26. A method according to claim 25 wherein said disconnection is effected solely by displacing said pump in said opposite generally horizontal direction and without disconnection of any pipe couplings.

27. A method according to claims 19 or 20 wherein steps (a) and (b) are accomplished solely by displacement of said pump in said generally horizontal direction.

28. In a tank containing a liquid, a filter having a suction side, communicating means in communication with the suction side of the filter, a discharge outlet conduit, and a pump having an inlet port, a discharge head and an impeller mounted on a shaft having a generally horizontal axis of rotation, said pump being disposable on the suction side of said filter in communication with said communicating means for suctioning liquid from said tank through said filter, said communicating means and said pump inlet port for discharge through said discharge head into said outlet conduit, a method of removing the pump from communication with the filtrate on the suction side of the filter, comprising the steps of:
 (a) disconnecting said pump inlet port and said communicating means one from the other below the level of liquid in the tank;
 (b) disconnecting said discharge head and said outlet conduit one from the other; and
 (c) wherein steps (a) and (b) are accomplished by displacing the pump in a generally horizontal direction.

29. In a tank for containing contaminated liquid machine tool coolant, a cylindrical drum filter for separating contaminants from the coolant to provide filtered coolant to a suction side of the filter, communicating means in communication with the suction side of the filter, a discharge outlet conduit, and a pump having an inlet port, a discharge head and an impeller mounted on a shaft having a generally horizontal axis of rotation, said pump being disposable on the suction side of said filter in communication with said communicating means for suctioning liquid from said tank through said filter, said communicating means and said pump inlet port for discharge through said discharge head into said outlet conduit, a method of removing the pump from communication with the filtrate on the suction side of the filter, comprising the steps of:
 (a) disconnecting said pump inlet port and said communicating means one from the other below the level of liquid in the tank;
 (b) disconnecting said discharge head and said outlet conduit one from the other; and
 (c) wherein steps (a) and (b) are accomplished by displacing the pump in a generally horizontal direction.

30. A method according to claim 28 or 29 wherein said disconnection of said pump inlet port and said communicating means on the one hand and the discharge head and said outlet conduit on the other hand is effected solely by displacement of said pump in said generally horizontal direction and without disconnection of any pipe couplings.

* * * * *